(No Model.) 2 Sheets—Sheet 1.

M. COVEL.
DISH WASHER.

No. 557,112. Patented Mar. 31, 1896.

Witnesses:
Chas. E. Gaylord.
Lute D. Alter.

Inventor:
Milo Covel.
By L. B. Coupland & Co
Attys.

(No Model.) 2 Sheets—Sheet 2.
M. COVEL.
DISH WASHER.
No. 557,112. Patented Mar. 31, 1896.
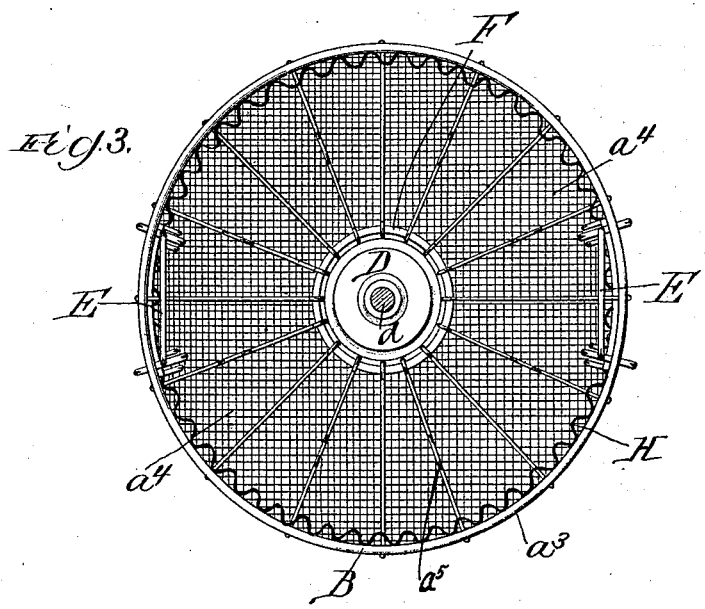
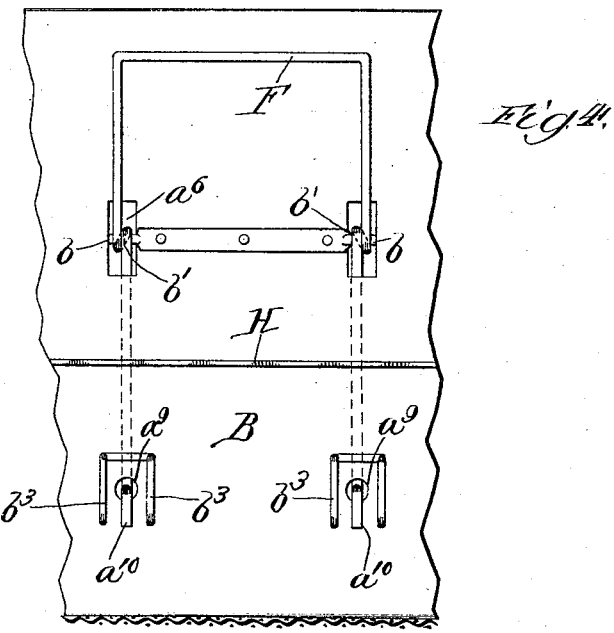
Witnesses:
Inventor:
Milo Covel.
By L. B. Coupland & Co
Att'ys.

UNITED STATES PATENT OFFICE.

MILO COVEL, OF CHICAGO, ILLINOIS, ASSIGNOR TO LEMUEL B. COUPLAND, OF SAME PLACE.

DISH-WASHER.

SPECIFICATION forming part of Letters Patent No. 557,112, dated March 31, 1896.

Application filed November 24, 1893. Serial No. 491,856. (No model.)

*To all whom it may concern:*

Be it known that I, MILO COVEL, a citizen of the United States, residing at Chicago, in the county of Cook and State of Illinois, have invented certain new and useful Improvements in Dish-Washers, of which the following is a full, clear, and exact description, that will enable others to make and use the same, reference being had to the accompanying drawings, forming a part of this specification.

This invention relates more especially to improvements in the class of hand dish-washers, and has for its object to provide a simple device of this character wherein the dishes are cleaned, rinsed and dried without removal from the original vessel in which they are placed, the same consisting of certain novel features in the construction, arrangement and operation of the device, as will be hereinafter set forth.

Figure 1:
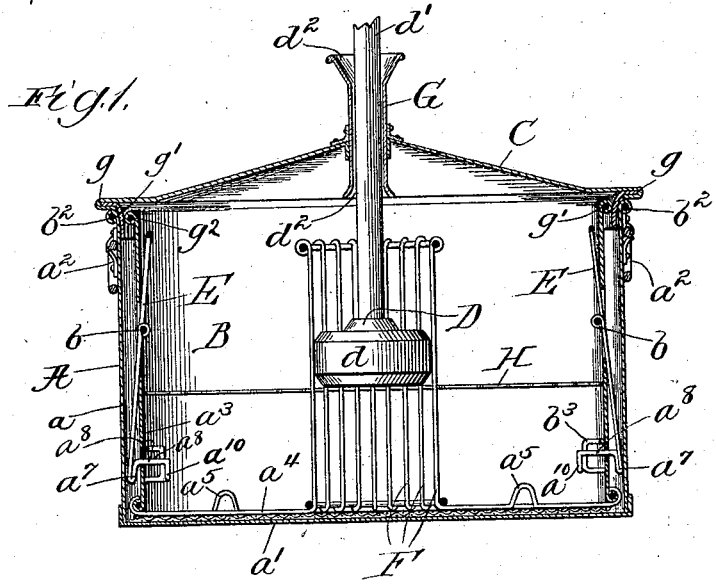
Figure 2:
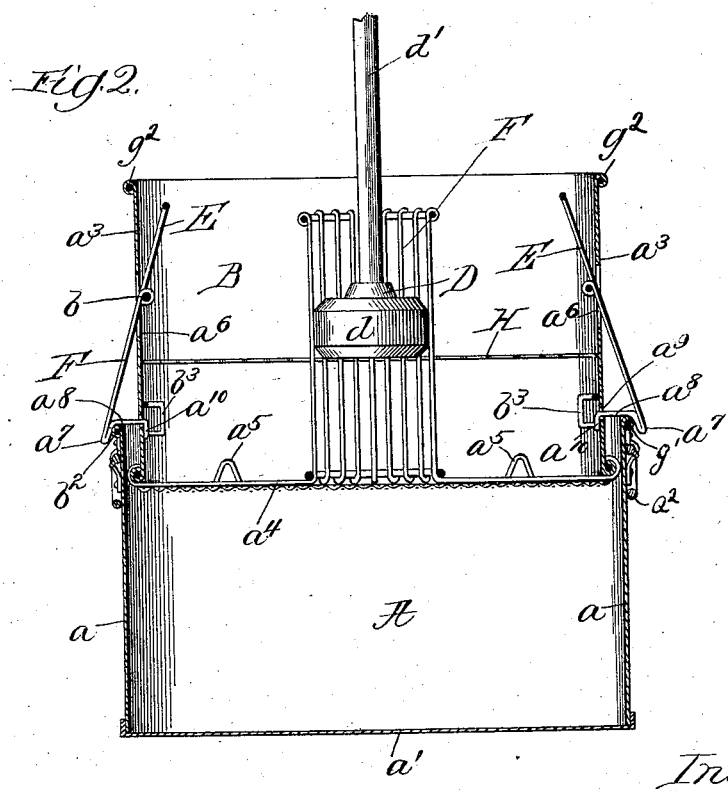

In the drawings, Figure 1 is a vertical transverse section of the device, the different parts being in position ready for use as a washer. Fig. 2 is a similar view showing the inner vessel in its elevated or rinsing position, the cover being removed; Fig. 3, a plan of the inner vessel, the plunger-handle being shown in section; and Fig. 4, a broken-away interior view of the inner vessel, showing details of one of the handle parts.

The device comprises a tight outer inclosing vessel A, an inner removable vessel B, cover C, plunger D, and various details of construction.

The outer vessel consists of the sides $a$, bottom $a'$, lifting-handles $a^2$, and the cover C. The inner vessel B consists of the imperforate sides $a^3$, the open basket-work or perforated bottom $a^4$, and handles E, the cover C serving to close both vessels during the process of washing, as shown in Fig. 1.

An open-work cylinder or plunger chamber extends upward from the central part of the inner vessel. The wires forming this chamber or cage may be integral with the wires forming the bottom of the vessel. This central chamber or cage is open at the bottom, so that the plunger may pass entirely through this chamber. The open-work or reticulated bottom of the inner vessel is provided with a number of standards $a^5$, which serve to support and separate the dishes when being arranged in place with reference to their particular shape, so that the water will reach the different surfaces and thereby greatly facilitate the process of washing, rinsing and draining.

The inner vessel B is preferably cylindrical, or approximately so, as shown. The openwork plunger-chamber is also cylindrical and connected with the imperforate sides $a^3$ of the vessel B.

The two handles F of the inner vessel B have dual functions: first, that of providing means for convenience in lifting, and, second, that of supporting the vessel in the rinsing position on the edge of the outer vessel, as shown in Fig. 2.

The upper lifting ends of the handles F are inside of the vessel B and extend downwardly through openings $a^6$, Fig. 4, in the side wall of said vessel to the outside, the lower ends being bent to form the shoulders $a^7$, the horizontal part $a^8$ returning through openings $a^9$ to the inside again and terminating in the hook end $a^{10}$. The handles F are supported near their longitudinal center by being loosely looped on pivot-pins $b$, as at $b'$, so as to have a slight rocking action and conform to the change required in the two positions of the inner vessel. When the inner vessel is placed in its lowermost position, Fig. 1, the lower ends of the handles are pressed inwardly in the annular space between the two vessels, either by contact with the adjacent surface of the outer vessel or by pressing the upper ends outwardly. When the inner vessel is raised to the position shown in Fig. 2, the upper ends of the handles are pressed inwardly, which imparts a corresponding outward movement to the lower ends and brings the horizontal part into position to rest on the beaded edge $b^2$ of the outer vessel, and in that manner support the inner vessel in its upper position above the wash-water.

The shoulders $a^7$ serve as a lock to prevent the handles from slipping inward, and the hook ends $a^{10}$ prevent the lower end from being disengaged from the inner vessel. The guards $b^3$, secured to the interior of the inner vessel, prevent the dishes from interfering with the free in-and-out movement of the lower ends of the handles.

The plunger D consists of the plunger or piston-head $d$ and handle $d'$. The plunger end is adapted to have a reciprocating movement in the open cylinder or chamber F, the handle end extending out through a tube G, fixed in the cover. This tubular bearing extends both above and below the cover, and is made flaring at each end, as shown at $d^2$, so that the dripping water from the handle will run down inside and not splash over or run down on the outside. The cover is provided with an overhanging rim $g$ and the annular downwardly-projecting flange $g'$, the latter fitting in between the beaded edge $b^2$ of the outer inclosing vessel and corresponding edge $g^2$ of the inside vessel, thus forming a tight joint and preventing any water from being splashed out by the action of the plunger.

A continuous guard-ring H is attached to the inner circumferential surface of the dish-holding vessel and serves the purpose of keeping the dishes from resting close against the sides, so as to provide a free circulation of the water between the dishes and the inclosing sides.

In operation, the dishes to be cleaned are arranged in the inside vessel and rest on the open-work bottom. The vessel is then lowered inside, Fig. 1, of the outer inclosing vessel, which is partly filled with soapy water, and the dishes submerged. The cover is then placed in position and the plunger worked rapidly up and down for a few minutes, which has the effect of greatly agitating and churning the water into foam. The water also reacts from the imperforate sides of the inner vessel, so that all parts of the dishes are reached and thoroughly cleaned. The cover is then removed and the dish-holding vessel raised up to the position shown in Fig. 2. The rinsing-water is next poured over the dishes and drains into the wash-water below. After the rinsing process the inner vessel may be entirely removed from the outer vessel, when the heat absorbed by the dishes will, ordinarily, be sufficient to thoroughly dry them. This arrangement permits of the use of boiling water, both for washing and rinsing purposes, and of the dishes being both cleaned and dried without ordinarily wetting the hands.

Care should be taken in washing glassware and other fragile articles by placing the same in the inner vessel in its elevated position and first warming them before being submerged, and thus avoid breaking.

This device may also be used for washing vegetables, scalding fruit, and for various other purposes, as will readily be suggested.

Having thus described my invention, what I claim as new, and desire to secure by Letters Patent, is—

1. The dish-washer described consisting essentially of the outer vessel, the inner cylindrical vessel having imperforate sides, a perforate bottom, and a central open-work dash-chamber, combined with a suitable dasher and cover, all substantially as described.

2. The dish-washer described, consisting essentially of an outer vessel, an inner cylindrical vessel having imperforate sides, a perforate bottom, and a central open-work dasher-chamber, and projections extending inwardly from said vessel to support the dishes, combined with a suitable dasher and cover, all substantially as described.

3. In a dish-washer, the combination with a dish-holding vessel, of a pair of handles free at both ends and having a pivotal bearing near their longitudinal center, the upper handle ends proper being on the inside of said vessel and then extending through the sides and down along the outside for some distance and turning inwardly through the sides again to the interior, and terminating in a hook end, substantially as set forth.

MILO COVEL.

Witnesses:
L. M. FREEMAN,
L. B. COUPLAND.